US011688041B2

(12) United States Patent
Jegannathan et al.

(10) Patent No.: US 11,688,041 B2
(45) Date of Patent: Jun. 27, 2023

(54) SYSTEM AND METHOD OF AUTOMATIC IMAGE ENHANCEMENT USING SYSTEM GENERATED FEEDBACK MECHANISM

(71) Applicant: INTERNATIONAL BUSINESS MACHINES CORPORATION, Armonk, NY (US)

(72) Inventors: Saigeetha Aswathnarayanan Jegannathan, Bangalore (IN); Sridhar Jonnala, Bangalore (IN); Harsha Deuri, Guwahati (IN); Venkata Jami, Srikakulam (IN); Prakriti Pritmani, Ahmedabad (IN); Aakash Praliya, Kota (IN)

(73) Assignee: International Business Machines Corporation, Armonk, NY (US)

(*) Notice: Subject to any disclaimer, the term of this patent is extended or adjusted under 35 U.S.C. 154(b) by 114 days.

(21) Appl. No.: 17/249,411

(22) Filed: Mar. 2, 2021

(65) Prior Publication Data
US 2022/0284548 A1 Sep. 8, 2022

(51) Int. Cl.
G06T 5/00 (2006.01)
G06T 5/10 (2006.01)
G06V 10/40 (2022.01)

(52) U.S. Cl.
CPC ............ *G06T 5/002* (2013.01); *G06T 5/003* (2013.01); *G06T 5/008* (2013.01); *G06T 5/009* (2013.01);
(Continued)

(58) Field of Classification Search
CPC ......... G06T 5/002; G06T 5/003; G06T 5/008; G06T 5/009; G06T 5/10;
(Continued)

(56) References Cited

U.S. PATENT DOCUMENTS

2008/0226147 A1 9/2008 Hargrove
2016/0217556 A1 7/2016 Agaian
(Continued)

FOREIGN PATENT DOCUMENTS

CN 111553855 A 8/2020
CN 111951207 A * 11/2020 ........... G06N 3/0454
(Continued)

OTHER PUBLICATIONS

Niu Y et al, english translation CN 1110951207 Image Quality Enhancing Method Based on Deep Enhancement Learning and Semantic Loss, published Nov. 17, 2020. (Year: 2020).*
(Continued)

*Primary Examiner* — John Villecco
*Assistant Examiner* — Kathleen M Broughton
(74) *Attorney, Agent, or Firm* — Samuel A. Waldbaum

(57) ABSTRACT

A method for automatically enhancing image data comprising receiving image data. Utilizing a neural network to analyze the image data to predict how each of a plurality of image enhancement processes will affect the image data. Utilizing the neural network to calculate a reward value for each of the plurality of enhancement processes that can be applied to the image data. Determining if the image data should be enhanced or not, wherein the determination is based on the predictions how each of the plurality of image enhancement processes will affect the image data. When it is determined that the image data should be enhanced, then determining which of the plurality of image enhancing process should be applied to the image data, wherein determination is based on the reward value for each of the plurality of enhancement processes. Applying the determined enhanced processes to the image data.

16 Claims, 5 Drawing Sheets

(52) U.S. Cl.
CPC ............... *G06T 5/10* (2013.01); *G06V 10/40* (2022.01); *G06T 2207/20084* (2013.01); *G06T 2207/20182* (2013.01); *G06T 2207/20201* (2013.01); *G06T 2207/20208* (2013.01)

(58) Field of Classification Search
CPC . G06T 2207/20084; G06T 2207/20182; G06T 2207/20201; G06T 2207/20208; G06V 10/40
See application file for complete search history.

(56) References Cited

U.S. PATENT DOCUMENTS

| | | | | |
|---|---|---|---|---|
| 2017/0249547 | A1* | 8/2017 | Shrikumar | G06N 3/084 |
| 2020/0134887 | A1* | 4/2020 | Zeng | G01R 33/561 |
| 2021/0001857 | A1* | 1/2021 | Nishitani | G06N 3/08 |

FOREIGN PATENT DOCUMENTS

| | | | | |
|---|---|---|---|---|
| CN | 112365428 A | * | 2/2021 | ........... G06N 3/0454 |
| WO | WO-2020006681 A1 | * | 1/2020 | ............. G06N 20/00 |

OTHER PUBLICATIONS

Yuan Y et al, english translation CN 112365428 DQN-based Highway Monitoring Video Defogging Method and System, published Feb. 12, 2021. (Year: 2021).*

Yan H et al, english translation WO 2020006681 Mark Data Obtaining Method and Apparatus, Training Method and Apparatus, and Medical Device, published Jan. 9, 2020. (Year: 2020).*

Abiko, et al., "Single Image Reflection Removal based on GAN with Gradient Constraint," IEEE Access, Oct. 14, 2019, pp. 148790-148799, vol. 7, DOI: 10.1109/ACCESS.2019.2947266, Retrieved from the Internet: <URL: https://ieeexplore.ieee.org/document/8868089>.

Disclosed Anonymously, "Method for image enhancement and automation of scanning beam tools," IP.com Prior Art Database Technical Disclosure, Jan. 15, 2003, 7 pages, IPCOM000010726D, Retrieved from the Internet: <URL: https://priorart.ip.com/IPCOM/000010726>.

Furuta, et al., "PixelRL: Fully Convolutional Network with Reinforcement Learning for Image Processing," IEEE Transactions on Multimedia, Dec. 16, 2019, 16 Pages, vol. 22, Issue 7, Cornel University, arXiv:1912.07190, Retrieved from the Internet: <URL: https://arxiv.org/pdf/1912.07190.pdf>.

Huang, et al., "V-D D3QN: the Variant of Double Deep Q-Learning Network with Dueling Architecture," 2018 37th Chinese Control Conference (CCC), Jul. 25-27, 2018 [accessed on Feb. 22, 2021], pp. 9130-9135, DOI: 10.23919/ChiCC.2018.8483478, Retrieved from the Internet: <URL: https://ieeexplore.ieee.org/document/8483478>.

Kupyn, et al., "DeblurGAN: Blind Motion Deblurring Using Conditional Adversarial Networks," Cornell University, Apr. 3, 2018, 10 pages, arXiv:1711.07064, Retrieved from the Internet: <URL: https://arxiv.org/abs/1711.07064>.

Mell, et al., "The NIST Definition of Cloud Computing", National Institute of Standards and Technology, Special Publication 800-145, Sep. 2011, 7 pages.

Minh, et al., "Automated Image Data Preprocessing with Deep Reinforcement Learning," Cornell University, Jun. 15, 2018, 9 pages, arXiv:1806.05886, Retrieved from the Internet: <URL: https://arxiv.org/abs/1806.05886>.

Park, et al., "Distort-and-Recover: Color Enhancement using Deep Reinforcement Learning," 3Korea Advanced Institute of Science and Technology (KAIST), 2018, pp. 5928-5936, Lunit, Inc., Retrieved from the Internet: <URL: https://openaccess.thecvf.com/content_cvpr_2018/papers/Park_Distort-and-Recover_Color_Enhancement_CVPR_2018_paper.pdf>.

Van Hasselt, et al., "Deep Reinforcement Learning with Double Q-Learning," AAAI'16: Proceedings of the Thirtieth AAAI Conference on Artificial Intelligence, Feb. 2016, pp. 2094-2100, Retrieved from the Internet: <URL: https://dl.acm.org/doi/10.5555/3016100.3016191>.

Wang, et al., Dueling Network Architectures for Deep Reinforcement Learning, Cornell University, Apr. 5, 2016, 15 pages, arXiv:1511.06581,Retreived from the Internet: <URL: https://arxiv.org/abs/1511.06581>.

Yadav, et al., "Contrast limited adaptive histogram equalization based enhancement for real time video system," 2014 International Conference on Advances in Computing, Communications and Informatics (ICACCI), Sep. 24-27, 2014 [accessed on Feb. 22, 2021], pp. 2392-2397, IEEE, DOI: 10.1109/ICACCI.2014.6968381, Retrieved from the Internet: <URL: https://ieeexplore.ieee.org/document/6968381>.

Brockman, et al., "OpenAI Gym," Cornell University, Jun. 5, 2016, 4 pages, arXiv:1606.01540v1, Retrieved from the Internet: <URL: https://arxiv.org/abs/1606.01540>.

He, et al., "Mask R-CNN," 2017 IEEE International Conference on Computer Vision (ICCV), Oct. 22-29, 2017 [accessed on Mar. 2, 2021], pp. 2980-2988, IEEE, Venice, IT, DOI: 10.1109/ICCV.2017.322, Retrieved from the Internet: <URL: https://ieeexplore.ieee.org/document/8237584>.

* cited by examiner

SYSTEM AND METHOD OF AUTOMATIC IMAGE ENHANCEMENT USING SYSTEM GENERATED FEEDBACK MECHANISM

BACKGROUND

The present invention relates generally to the field of image enhancement, and more particularly to automatically evaluating and enhancing an image.

Data preprocessing improves the quality of raw experimental data. For image data, a user will determine which type of enhancement process should be applied to the image data to improve the quality of the image data. Deciding which enhancement process to use can be a rigorous and tiresome task requiring huge time investment of a user. For image data, preprocessing typically involves a sequence of basic transformations such as cropping, de-blurring, enhancing brightness or de-noising. Currently, a user decides based on their experience which enhancement(s) to apply to the image data and in which order to apply the enhancement(s) to a given image data set.

BRIEF SUMMARY

Additional aspects and/or advantages will be set forth in part in the description which follows and, in part, will be apparent from the description, or may be learned by practice of the invention.

A method for automatically enhancing image data comprising receiving image data. Utilizing a neural network to analyze the image data to predict how each of a plurality of image enhancement processes will affect the image data. Utilizing the neural network to calculate a reward value for each of the plurality of enhancement processes that can be applied to the image data. Determining if the image data should be enhanced or not, wherein the determination is based on the predictions how each of the plurality of image enhancement processes will affect the image data. When it is determined that the image data should be enhanced, then determining which of the plurality of image enhancing process should be applied to the image data, wherein determination is based on the reward value for each of the plurality of enhancement processes. Applying the determined enhanced processes to the image data.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION

Figure 1:
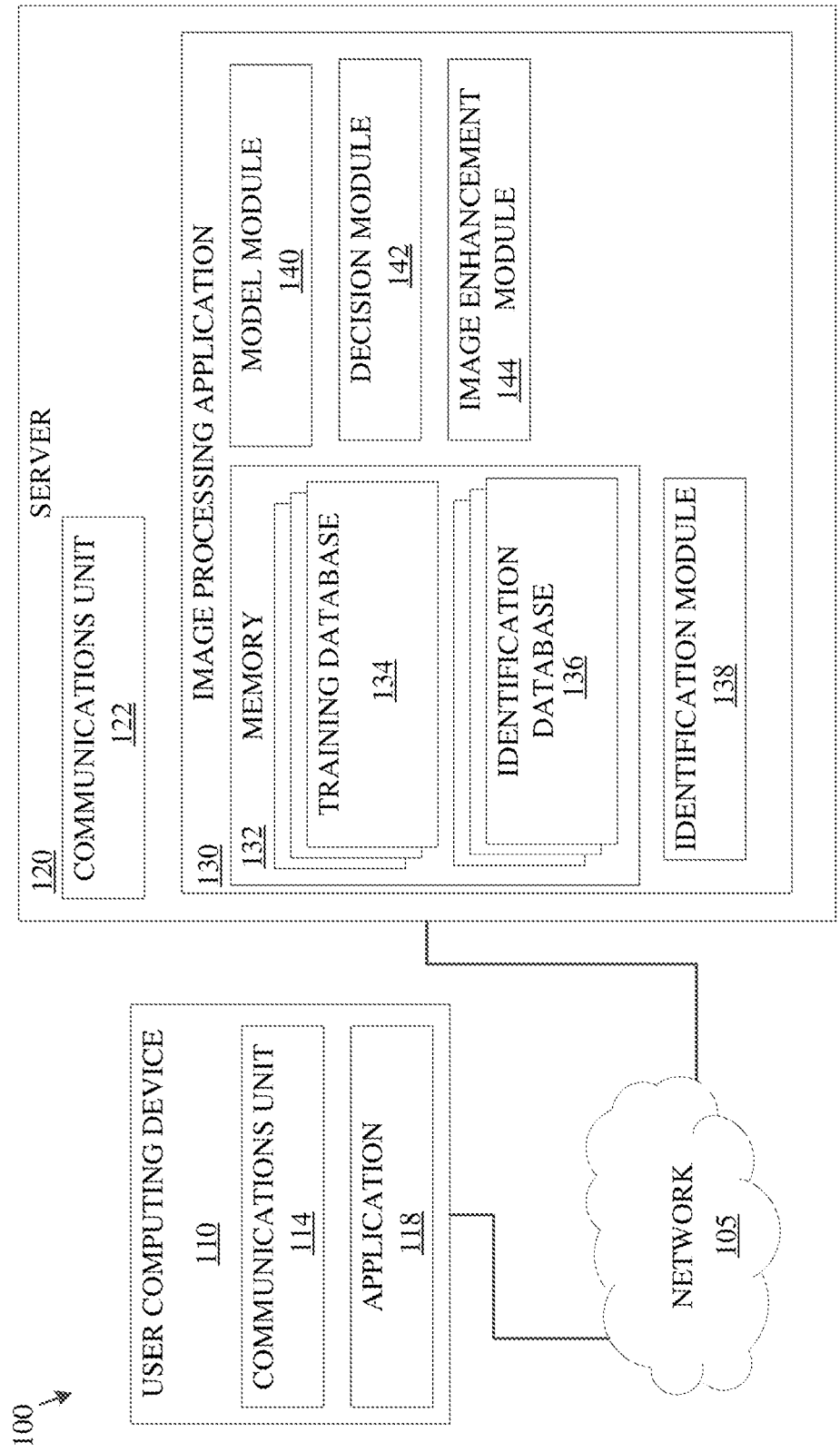
FIG. 1 is a functional block diagram illustrating an automatic image enhancement processing environment, in accordance with an embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings but are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Reference will now be made in detail to the embodiments of the present invention, examples of which are illustrated in the accompanying drawings, wherein like reference numerals refer to like elements throughout. Embodiments of the invention are generally directed to a process of automatically enhancing image data. Image enhancement/image preprocessing techniques play a major role in enhancing visual quality of images for better accuracy in object recognition problems.

However, the following are common challenges that are encountered during image pre-processing/enhancement. Variation in image data quality can require the application of a variety of enhancement techniques to the image data. Furthermore, one set of enhancement techniques may not always be applicable to all the data contained within a large data set. Manual intervention is used to identify the optimal enhancement techniques and degree of enhancement for the data contained within the data set. The preprocessing time is based on the time required for the user to determine which enhancement technique or techniques to use and the time required for the user to determine the degree of enhancement for each technique. The results of the outputted enhanced image data are solely based on the user experience, such that, different users would produce different enhanced images. Therefore, the quality of the enhanced image data is determined by the experience of the user, thus making it hard to reproduce similar results with different users.

To mitigate the above-mentioned challenges, the present invention improves the computer by allowing the computer to automatically determine which enhancement technique(s) to use and the degree of enhancement. The present invention can distinguish and identify the required enhancement techniques and extent of enhancement required for each individual image. The process is automatic without having the user input the type of enhancement or the extent of the enhancement. The automated decision process for enhancing the image data reduces the image pre-processing time. The present inventions automated enhancement decision process results in higher repeatable accuracy (removes the variation between users) and an automatic feedback mechanism that allows for checking the quality of the enhanced image data and to learn from each enhancement process. The present invention also can identify and eliminate very poor-quality images contained within a data set.

The present invention analyzes the image to determine the features contained within the image that can be identified and counts the number of features identified. The number of identified features is considered when determining which enhancement process to be applied to the image data set. The present invention utilizes a reference model on a Double Dueling Deep Q Network (D3QN) neural networks to analyze the image. The reference model on the D3QN determines a reward rating for each enhancement process that can be applied to the image data. The reward rating is based on the training of the reference model utilized by the D3QN and the image data. The decision module assesses the above values (features count and reward values) to determine if the image requires any enhancement. When the decision module determines that enhancement is needed, then it determines which enhancement process to apply to the image data based on the determined rewards values for each enhancement process. This processing is repeated (e.g., identify features, calculating a reward value, and applying the enhancement) until the decision module decides that the image data does not need further enhancement. When after multiple enhancement iterations, the image quality does not show significant improvement, then the image is discarded (e.g., the image is outputted to the user and the user is notified that the image quality is bad). The resulting improvements to the image are used to further train the reference model on D3QN to provide better enhancement determination for future images. The present invention outputs the enhanced image, the original image, and a report. The report contains information about which enhancement process were applied to the image, the number of enhancement stages (e.g., the number of analysis and enhancement loops), the values used for each enhancement process, and possibly multiple versions of the image as it goes through the enhancement process.

FIG. 1 is a functional block diagram illustrating an automatic image enhancement processing environment 100, in accordance with an embodiment of the present invention.

Network 105 can be, for example, a local area network (LAN), a wide area network (WAN) such as the Internet, or a combination of the two, and can include wired, wireless, or fiber optic connections. In general, network 105 can be any combination of connections and protocols that will support communications between server 120 and user computing device 110.

User computing device 110 may be a laptop computer, tablet computer, netbook computer, personal computer (PC), a desktop computer, a personal digital assistant (PDA), a smart phone, camera, or any programmable electronic device capable of communicating with the server 120 via the network 105. User computing device 110 may include internal and external hardware components, as depicted, and described in further detail with respect to FIG. 3. The user computing device 110 has an application 118 that generates image data. For example, application can be camera, a photo album, a scanner that generates an image, or any other type of device or application that is able to generator or accept image data. The communications unit 114 allows for the image data to be sent to or received from the server 120. FIG. 1 illustrates that the image processing application 130 as being on a separate server 120, but the image processing application 130 can be included on the user computing device 110 or be part of application 118.

Figure 4:
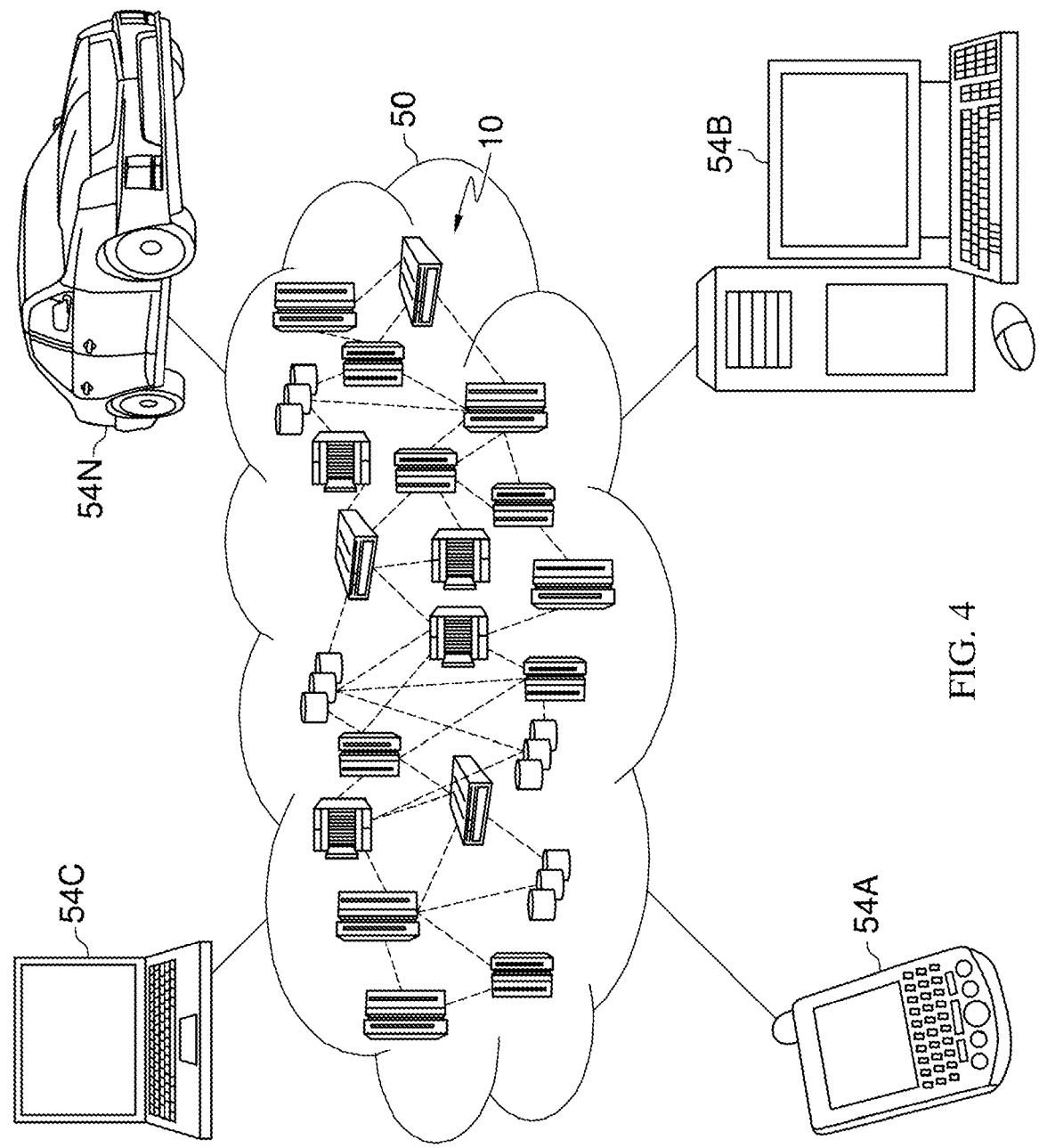
FIG. 4 depicts a cloud computing environment according to an embodiment of the present invention.
Figure 5:
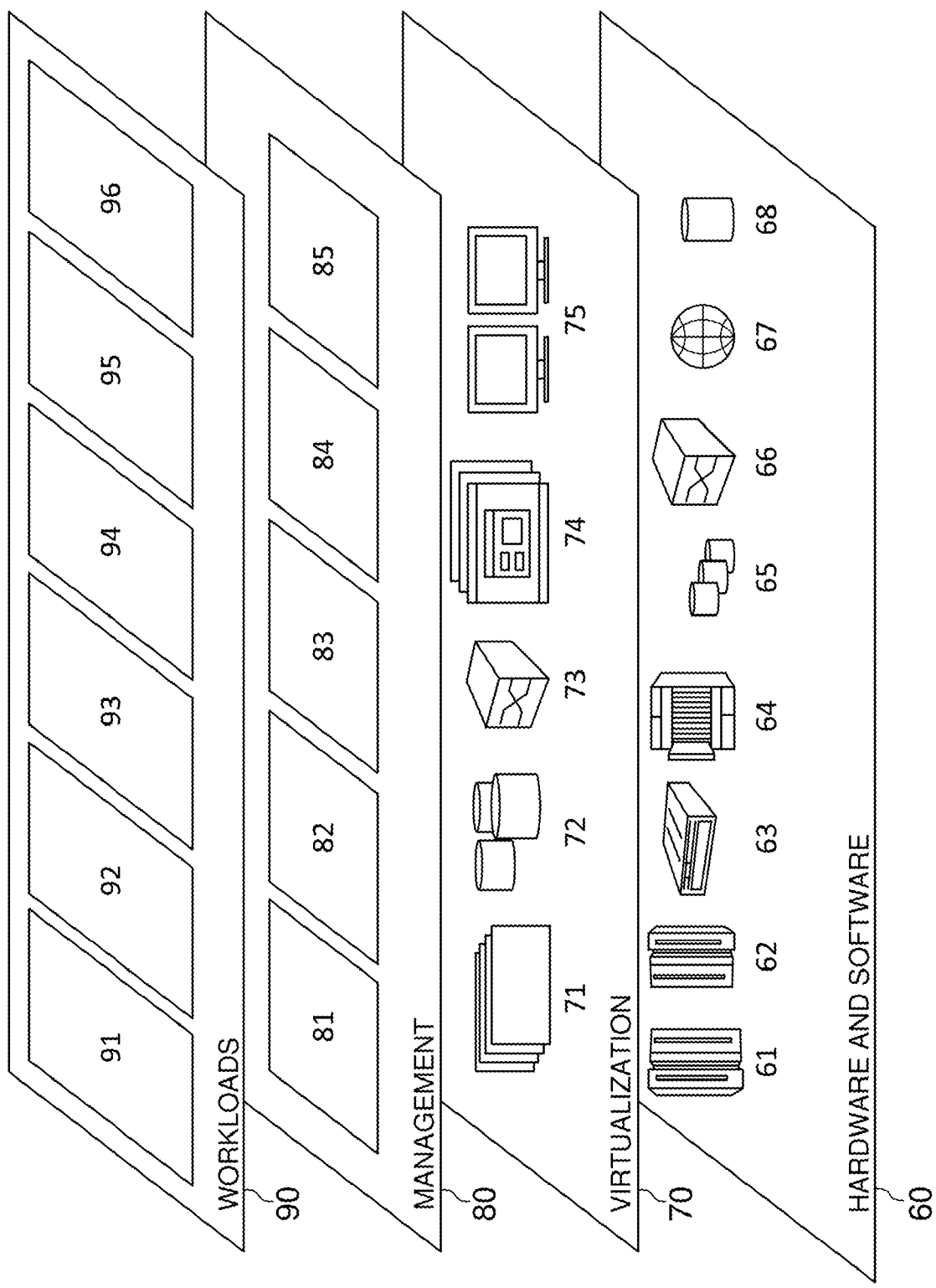
FIG. 5 depicts abstraction model layers according to an embodiment of the present invention.

Server 120 includes a communications unit 122 and an image processing application 130. Server 120 may be a laptop computer, tablet computer, netbook computer, personal computer (PC), a desktop computer, a personal digital assistant (PDA), a smart phone, server blade, or any programmable electronic device capable of communicating with the user computing device 110, via the network 105. The communications unit 122 allows for the server 120 to receive and send image data over the network 105. Server 120 may include internal and external hardware components, as depicted, and described in further detail below with respect to FIG. 3, and operate in a cloud computing environment, as depicted in FIGS. 4 and 5.

The image processing application 130 includes memory 132, training database 134, identification database 136, identification module 138, model module 140, decision module 142, and image enhancement module 144. The memory 132 can be any type of memory device that is able to store data. The training database 134 is a datastore that stores training data that is used to train or used by the reference model on the neural network of the model module 140. The identification database 136 is a datastore or a plurality of datastores that contains identification information that is used to identified items or features in an image.

The identification module 138 utilizes image recognition algorithms to analyze the image data being processed. The identification module 138 identifies features within an image and compares the features to the data contained within the identification database 136. The identification module 138 determines if the identified features have a match in the identification database 136. The identification module 138 can identify a feature within the image data (e.g., the feature is present in the image), but the identified feature might not match any feature stored in the identification database 136. The image module 138 counts the number of identified features (e.g., features with a match in the identification database 136) contained with the image data.

The model module 140 is a neural network, for example, a Dueling Double Deep Q Network (D3QN). D3QN uses two identical neural network models. One learns during the experience replay, just like DQN does, and the other one is a copy of the last episode of the first model. The Q-value is actually computed with this second model.

A vanilla deep Q learning has two main setbacks, namely a bias problem and a moving target problem. The bias problem occurs as deep Q networks tend to overestimate in noisy environments, which leads to non-optimal training outcomes. The moving target problem arise because the same network is responsible in choosing the actions as well as evaluating the actions, which results in instability in training.

The D3QN model uses the Dueling DQN architecture as its base. It consists of CNN input layers and a common flatten layer. The flatten layer splits into two fully connected layers. The first generates a single value function (V(s)). The second layer results into multiple advantage functions depending on the number of actions, which in case of the present invention the number and type of image enhancement that can be applied to the image data. The value and advantage functions are passed onto the aggregation layer, which results into their respective Q values.

The model module 140 uses the D3QN to apply a reference model to the image data. The model module 140 utilizes the reference model to calculate a confidence score of the original image (or a previously enhanced image) based on the quality of the image data and calculates a confidence score of the transformed image (e.g., after an image enhancement process is applied to the image) with the help of feedback from the pre-trained model. The model module 140 uses the D3QN to calculate a reward value for the image, where the reward value is based on predicting how the image will look after one or more image enhancing process(es) is applied to the image. Reward value is calculated by comparing the confidence score of the original image and the confidence score of the transformed image with the help of feedback from the pre-trained model. The target of the D3QN (Dueling Double Deep Q Network) of the model module 140 is to maximize the reward value by applying a sequence of transformations on the image.

The decision module 142 decides the quality of the image (e.g., excellent, needs work, or bad) and determines which image enhancement process will be applied to the image. Based on the image quality the decision module 142 determines if the enhancement process is complete, incomplete, or the image has to be rejected. The decision module 142 determines which enhancement process(es) should be applied to the image data to increase the quality of the image data. The decision module 142 receives the count of the identified features from the identification module 138 and receives the reward value from the model module 140. The decision module 142 receives a list of enhancement process and the reward value associated with each enhancement process from the model module 140. When the decision module 142 determines that the image data should be enhanced (first time or again), then the decision module 142 determines which enhancement process(es) should be applied to the image data based on the count of identified features and the received reward value. The decision module 142 uses feedback values from the enhancement process to help determine the quality of the image data and to decide whether the image is adequately enhanced or whether it still needs to undergo further enhancements. Once the requirement criteria are met (e.g., excellent image) the decision module 142 stops the enhancement process on the image and generates an enhancement report to be outputted with the enhancement image.

Once the decision module 142 decides to proceed with the image enhancement then the image enhancement module 144 performs the enhancement process on the image data. The image enhancement module 144 can perform a variety of enhancement processes on the image data, for example, the image enhancement process can be deblurring, denoising, glare removal, brightness adjustment, resolution, or a different enhancement process. The image enhancement module 144 can perform one or more enhancement processes at a time on the image data. The image enhancement module 144 can perform the same enhancement process multiple times when the decision module 142 recommends performing the same enhancement process again. The enhancement module 144 sends the data (e.g., values used) about the enhancement process used on the image data to the decision module 140 and to the model module 140.

Once the image data has been processed by the enhancement module 142, then the enhanced image data is sent to the identification module 138 to identify and count the features within the enhanced image data. The model module 140 receives the enhanced image data and runs the data through the reference model in the neural network (for example, D3QN) to calculate a new reward value for each of the enhancement processes. The new reward value for the enhanced image data is based on the output of the reference model applying at least one more enhancement process to the enhanced image data. The decision module 142 determines if the enhancement process should proceed or if it should be stopped based on the quality of the image data. The decision module 142 determines if the enhancement process will increase the quality of the image data. The decision module 142 determines if the enhancement process will increase the quality of the image data based on the reward value from the model module 140, the count of identified features from the identification module 138, and a predicted image result for the enhancement process from the model module 140. When the decision module 142 decides to continue the enhancement process, then the enhanced image data is sent to the image enhancement module 144 for processing. The process of evaluating, deciding, and enhancing can be repeated multiple times till the decision module 142 decides to end the enhancement process. When the decision module 142 decides to end the enhancement process, then the decision module 142 generates an enhancement report. The enhancement report can contain information about the enhancement process applied to the image data, the number of enhancement processes applied, the values of the process, examples of the image data at each stage of the processing, or other data about the enhancement processes. The enhancement report can also include a version of the image data at each stage of the enhancement process. The decision module 142 further transmits the enhanced image data, the original image data (i.e., the inputted image that has not been enhanced), and the enhancement report to the user computing device 110. The enhancement report allows for the user to follow the order of the enhancements processes applied to the image data and can allow for the user to select a different image than the outputted image based on a selected stage of the enhancement process.

Figure 2:
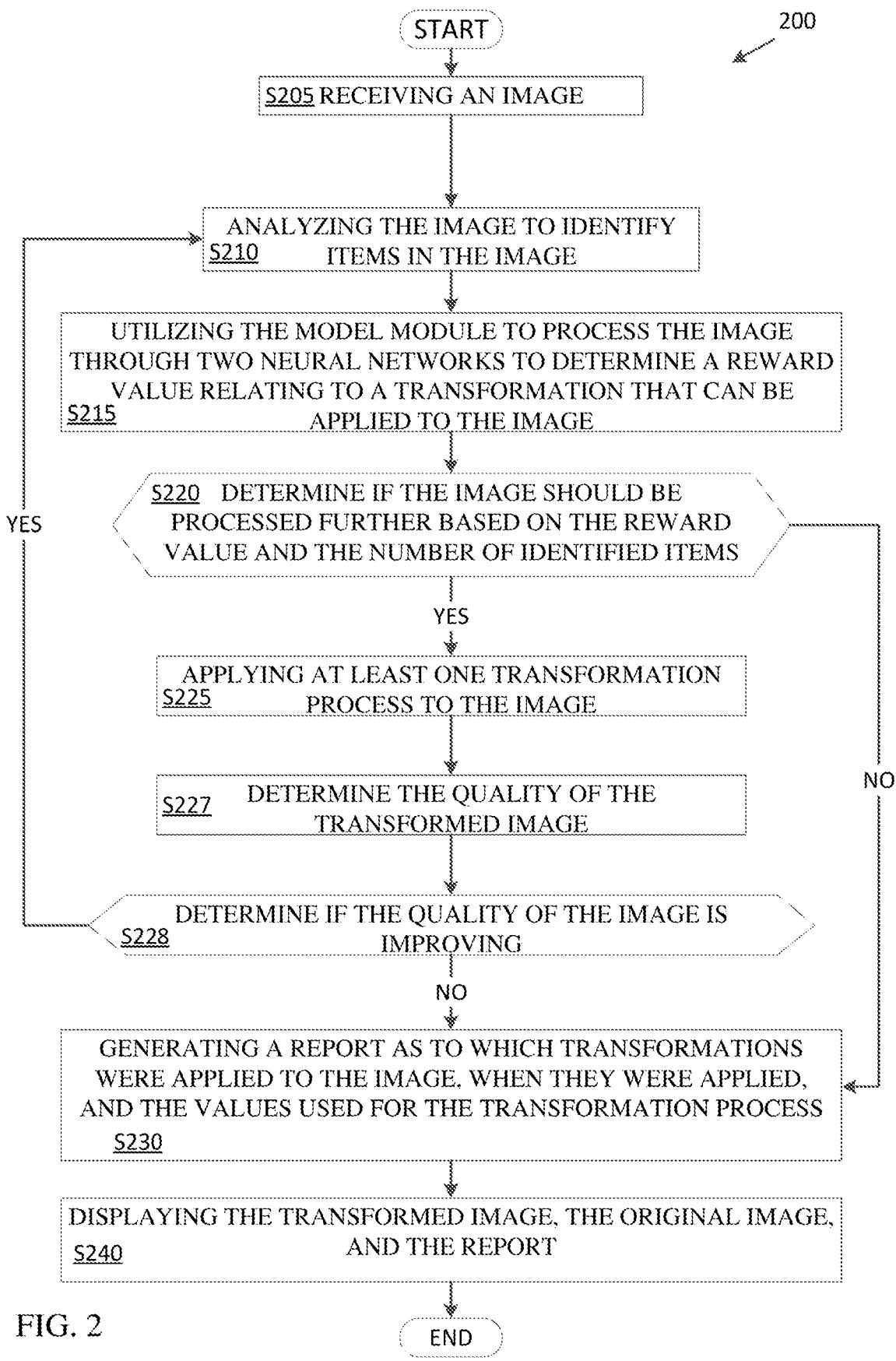
FIG. 2 illustrate an example process for automatically enhancing an image, in accordance with an embodiment of the present invention.

FIG. 2 illustrate an example process 200 for automatically enhancing an image, in accordance with an embodiment of the present invention.

The image processing application 130 that is located on server 120 (or can be located on user computing device 110) receives an original image for processing (S205). The image identification module 138 analyzes the image data looking for different features contained within the image data (S210). The image identification module 138 determines if the found features match any data stored in the identification database 136 by comparing the found features to the stored data (S210). The image identification module 138 counts how many features matched the stored data and provides the count to the decision module 142 (S210). The model module 140 receives the original image data and runs the image data through a reference model on a neural network (for example, a D3QN) to determine which enhancement process(es) that can be applied to the original image data (S215). The model module 140 calculates a reward value for each enhancement process that can be applied to the image data (S215). The model module 140 uses the reference model to determine the possible outcomes for each enhancement process that can be applied to the image data based on the training of reference model (S215). The reference model is trained using the data stored in the training database 134. The decision module 142 receives the rewards value for each enhancement process to be applied to the image data and receives the count of the identified features (S220). The decision module 142 determines the quality of the image data, for example, excellent, needs work, or bad, to decide if the image data should be enhanced or not (S220). When the decision module 142 determines the image data is bad based on the reward value from the model module 140 and the count from the identification module 138, then the decision module 142 ends the enhancement process (S220). When the decision module 142 determines the image data is excellent based on the reward value from the model module 140 and the count from the identification module 138, then the decision module 142 ends the enhancement process (S220). When the decision module 142 determines that the image data needs work than the decision module 142 determines which enhancement process(es) should be applied to the image data (S220). The decision module 142 determines which enhancement process(es) to apply to the image data based on the reward value calculated by the model module 140 (S220). The decision module 142 can decide to apply only one enhancement process image data or the decision module 142 can decide to apply a plurality enhancement processes to the image data (S220). The image enhancement module 144 applies the enhancement process or processes to the image data (S225) and sends the values for the enhancement process (for example, brightness was increased by X %) to the decision module 142 (S225). The decision module 142 determines the quality of the enhanced image data (e.g. excellent, needs work, or bad) (S227). The decision module 142 determines if the quality of the image is improving or if the image quality is not improving (S228). When the quality of the enhanced image data is improving then the enhanced image data is sent back to the identification module 138 to repeat the enhancement process again. The enhancement process can be repeated multiple times where the same or different enhancement processes are applied to the image data. When the decision module 142 determines that the quality of the enhanced image data is not improving, then the decision module stops the enhancement process and generates an enhancement report (S230). Once the decision module 142 determines the image data no longer needs to be enhanced or the image data is bad (S220), then the decision module 142 generates an enhancement report (S230). The enhancement report includes the number of times the image data went through the enhancement process, the type of enhancement process(es) applied to the image data each time it went through the enhancement process, the values for each of the enhancement process, and could include a sample of the image for each time the image went through the enhancement process (S230). The decision module 142 outputs the enhanced image, the original image, and the enhancement report to be displayed on user computing device 110 (S240).

Figure 3:
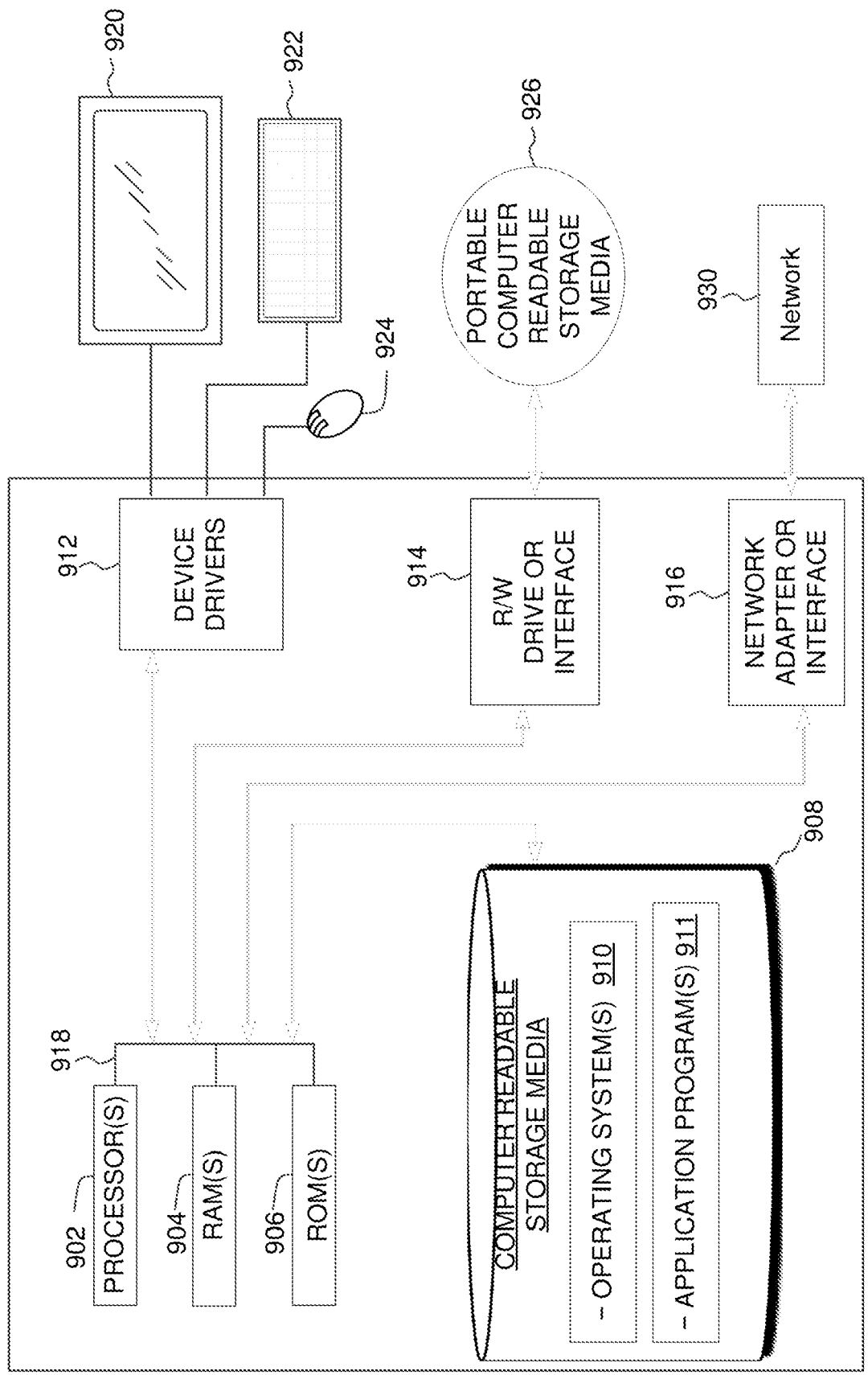
FIG. 3 is a block diagram of components of a computing device of the software application evaluation processing environment of FIG. 1, in accordance with embodiments of the present invention.

FIG. 3 depicts a block diagram of components of server 120 and user computing device 110 of FIG. 1, in accordance with an embodiment of the present invention. It should be appreciated that FIG. 4 provides only an illustration of one implementation and does not imply any limitations regarding the environments in which different embodiments may be implemented. Many modifications to the depicted environment may be made.

Server 120 and user computing device 110 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. The network adapter 916 communicates with a network 930. Communications fabric 918 may be implemented with any architecture designed for passing data and/or control information between processors (such as microprocessors, communications, and network processors, etc.), system memory, peripheral devices, and any other hardware components within a system.

One or more operating systems 910, and one or more application programs 911, for example, of image processing application 130 (FIG. 1), are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Server 120 and user computing device 110 may also include a R/W drive or interface 914 to read from and write to one or more portable computer readable storage media 926. Application programs 911 on server 120 and user computing device 110 may be stored on one or more of the portable computer readable storage media 926, read via the respective RAY drive or interface 914 and loaded into the respective computer readable storage media 908.

Server 120 and user computing device 110 may also include a network adapter or interface 916, such as a Transmission Control Protocol (TCP)/Internet Protocol (IP) adapter card or wireless communication adapter (such as a 4G wireless communication adapter using Orthogonal Frequency Division Multiple Access (OFDMA) technology). Application programs 911 on server 120 and user computing device 110 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Server 120 and user computing device 110 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Referring now to FIG. 5, a set of functional abstraction layers provided by cloud computing environment 50 (FIG. 4) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and image processing application 96.

Based on the foregoing, a computer system, method, and computer program product have been disclosed. However, numerous modifications and substitutions can be made without deviating from the scope of the present invention. Therefore, the present invention has been disclosed by way of example and not limitation.

While the invention has been shown and described with reference to certain exemplary embodiments thereof, it will be understood by those skilled in the art that various changes in form and details may be made therein without departing from the spirit and scope of the present invention as defined by the appended claims and their equivalents.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the one or more embodiment, the practical application or technical improvement over technologies found in the marketplace, or to enable others of ordinary skill in the art to understand the embodiments disclosed herein.

What is claimed is:

1. A method for automatically enhancing image data, the method comprising:
   receiving, by a computer, image data;
   utilizing, by the computer, a neural network to analyze the image data to predict how each of a plurality of image enhancement processes will affect the image data;
   utilizing, by the computer, the neural network to calculate a reward value for each of the plurality of enhancement processes that can be applied to the image data;
   analyzing, by the computer, the image data to identify features contained within the image data;
   determining, by the computer, if the identified features match stored features stored in a datastore;
   counting, by the computer, a number of matched identified features and a number of non-matching identified features;
   determining, by the computer, if the image data should be enhanced or not, wherein the determination is based on the predictions how each of the plurality of image enhancement processes will affect the image data, wherein the determination is based on the number of matched identified features and based on the number of non-matching identified features;
   in response to determining that the image data should be enhanced, then determining, by the computer, which of the plurality of image enhancing process should be applied to the image data, wherein determination is based on the reward value for each of the plurality of enhancement processes; and
   applying, by the computer, the determined enhanced processes to the image data.

2. The method of claim 1, wherein the plurality of enhancement processes is comprised of deblurring, denoising, glare removal, brightness adjustment, and resolution enhancement.

3. The method of claim 1, further comprising:
   utilizing, by the computer, the neural network to analyze the enhanced image data and calculating, by the computer, a new reward value for each of the plurality of enhancement processes to be applied to the enhanced image data;
   determining, by the computer, if the enhanced image data should be enhanced again or not, wherein the determination is based on the predictions how each of the plurality of image enhancement processes will affect the enhanced image data;
   wherein when it is determined that the enhanced image data should be enhanced again, then determining, by the computer, which of the plurality of image enhancing process should be applied to the enhanced image data, wherein the determination is based on the reward value for each of the plurality of enhancement processes; and
   applying, by the computer, the determined enhanced processes to the enhanced image data.

4. The method of claim 3, further comprising:
   wherein when it is determined that the enhanced image data should not be enhanced again, outputting, by the computer, the enhanced image to a user computing device.

5. The method of claim 4, further comprising:
   generating, by the computer, an enhancement report, wherein the enhancement report includes each enhancement process applied to the image data and the enhancement values associated with each enhancement process; and
   outputting, by the computer, the enhancement report with the outputted enhanced image data.

6. The method of claim 1, wherein the neural network is a Dueling Double Deep Q Network (D3QN).

7. A computer program product for automatically enhancing image data, the computer program product comprising:
   one or more non-transitory computer-readable storage media and program instructions stored on the one or more non-transitory computer-readable storage media, the program instructions comprising:
   program instructions to receive image data;
   program instructions to utilize a neural network to analyze the image data to predict how each of a plurality of image enhancement processes will affect the image data;
   program instructions to utilize the neural network to calculate a reward value for each of the plurality of enhancement processes that can be applied to the image data;
   program instructions to analyze the image data to identify features contained within the image data;
   program instructions to determine if the identified features match stored features stored in a datastore;
   program instructions to count a number of matched identified features and a number of non-matching identified features;
   program instructions to determine if the image data should be enhanced or not, wherein the determination is based on the predictions how each of the plurality of image enhancement processes will affect the image data, wherein the determination is based on the number of matched identified features and based on the number of non-matching identified features;

in response to determining that the image data should be enhanced, then program instructions to determine which of the plurality of image enhancing process should be applied to the image data, wherein determination is based on the reward value for each of the plurality of enhancement processes; and program instructions to apply the determined enhanced processes to the image data.

8. The computer program product of claim 7, wherein the plurality of enhancement processes is comprised of deblurring, denoising, glare removal, brightness adjustment, and resolution enhancement.

9. The computer program product of claim 7, further comprising:

program instructions to utilize the neural network to analyze the enhanced image data and program instructions to calculate a new reward value for each of the plurality of enhancement processes to be applied to the enhanced image data;

program instructions to determine if the enhanced image data should be enhanced again or not, wherein the determination is based on the predictions how each of the plurality of image enhancement processes will affect the enhanced image data;

wherein when it is determined that the enhanced image data should be enhanced again, then program instructions to determine which of the plurality of image enhancing process should be applied to the enhanced image data, wherein determination is based on the reward value for each of the plurality of enhancement processes; and program instructions to apply the determined enhanced processes to the enhanced image data.

10. The computer program product of claim 9, further comprising:

wherein when it is determined that the enhanced image data should not be enhanced again, program instructions to output the enhanced image to a user computing device.

11. The computer program product of claim 10, further comprising:

program instructions to generate an enhancement report and to output the enhancement report with the enhanced image data, wherein the enhancement report includes each enhancement process applied to the image data and the enhancement values associated with each enhancement process.

12. The computer program product of claim 7, wherein the neural network is a Dueling Double Deep Q Network (D3QN).

13. A computer system for automatically enhancing image data, the computer system comprising:

one or more computer processors, one or more computer-readable storage media, and program instructions stored on the one or more of the computer-readable storage media for execution by at least one of the one or more processors, the program instructions comprising:

program instructions to receive image data;

program instructions to utilize a neural network to analyze the image data to predict how each of a plurality of image enhancement processes will affect the image data;

program instructions to utilize the neural network to calculate a reward value for each of the plurality of enhancement processes that can be applied to the image data;

program instructions to analyze the image data to identify features contained within the image data;

program instructions to determine if the identified features match stored features stored in a datastore;

program instructions to count a number of matched identified features and a number of non-matching identified features;

program instructions to determine if the image data should be enhanced or not, wherein the determination is based on the predictions how each of the plurality of image enhancement processes will affect the image data, wherein the determination is based on the number of matched identified features and based on the number of non-matching identified features;

in response to determining that the image data should be enhanced, then program instructions to determine which of the plurality of image enhancing process should be applied to the image data, wherein determination is based on the reward value for each of the plurality of enhancement processes; and program instructions to apply the determined enhanced processes to the image data.

14. The computer system of claim 13, further comprising:

program instructions to utilize the neural network to analyze the enhanced image data and program instructions to calculate a new reward value for each of the plurality of enhancement processes to be applied to the enhanced image data;

program instructions to determine if the enhanced image data should be enhanced again or not, wherein the determination is based on the predictions how each of the plurality of image enhancement processes will affect the enhanced image data;

wherein when it is determined that the enhanced image data should be enhanced again, then program instructions to determine which of the plurality of image enhancing process should be applied to the enhanced image data, wherein determination is based on the reward value for each of the plurality of enhancement processes;

program instructions to apply the determined enhanced processes to the enhanced image data; and wherein when it is determined that the enhanced image data should not be enhanced again, program instructions to output the enhanced image to a user computing device.

15. The computer system of claim 13, further comprising:

program instructions to generate an enhancement report and to output the enhancement report with the enhanced image data, wherein the enhancement report includes each enhancement process applied to the image data and the enhancement values associated with each enhancement process.

16. The computer system of claim 13, wherein the neural network is a Dueling Double Deep Q Network (D3QN).

\* \* \* \* \*